Feb. 21, 1933.  A. LOWNDES  1,745,681

CENTRIFUGAL CLUTCH

Filed Dec. 29, 1927

Inventor
ARTHUR LOWNDES
By Frederick S. Bromley
Attorney.

Patented Feb. 4, 1930

1,745,681

UNITED STATES PATENT OFFICE

ARTHUR LOWNDES, OF TORONTO, ONTARIO, CANADA

CENTRIFUGAL CLUTCH    REISSUED

Application filed December 29, 1927. Serial No. 243,342.

The invention relates to improvements in centrifugal clutches as described in the present specification and shown in the accompanying drawings which form part of the same.

The invention appertains primarily to centrifugal clutches of the class employed for the purpose of gradually applying the load to a prime mover, such as an induction motor, as it is started. As is well known, it is imperative that some form of intermediary be used in conjunction with a motor of this nature in order to slowly apply the load and thus avoid consequent detrimental results. This clutch therefore has been designed chiefly with a view to producing a more efficacious and serviceable device for the purpose aforementioned, although it is capable of general application in the transmission of power where it is necessary to relieve jar and strain incidental to the sudden picking up of a load.

One salient feature of the present invention is that the friction shoes interfit one with another so that they advance and recede in unison under centrifugal force, maintaining at all times the balance of the clutch.

A further improvement resides in the utilization of the maximum potential area of contact for a given size of clutch and in the maximum weight of shoes, which results in transmission of high torque at comparatively low speeds.

A still further advantage is presented by constraining elements for precluding the metal shoes from coming in contact with the drum when the lining is excessively worn.

Referring to the accompanying drawings:
Figure 1 is a vertical section through the clutch, taken axially.

Like numerals of reference indicate corresponding parts in each of the figures throughout the drawings.

Figure 1:
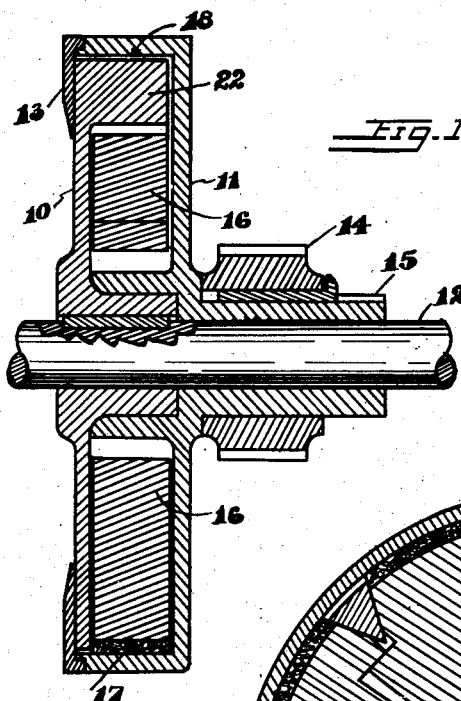
Figure 2:
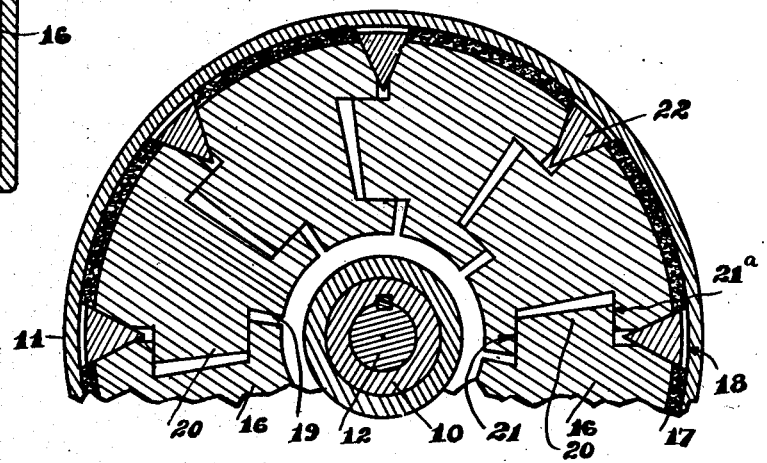
Figure 2 is a section taken at right angles to the axis and depicting the major portion of the lower half broken away. In this view the shoes are shown expanded.

In the drawings, the reference numeral 10 denotes generally the driving member of the clutch and 11 the driven member hereinafter referred to as "the drum."

The driving member is keyed or otherwise secured to the shaft 12 which extends as usual from the prime mover or other source of power transmission. The drum is mounted for independent rotation on the shaft and is retained against axial movement in the present instance by a ring 13 bolted to the drum and shouldered against the driving member, although it is to be understood that other means may be employed for this end. The drum carries a spur-gear 14 or means for taking off power, which gear is fastened to the boss 15.

The shoes 16 are disposed between the driving member and the drum, and are free to move radially outwardly under centrifugal action. Each shoe is a segment of a ring and is faced with a lining, as at 17, for engagement with the interior polished surface 18 of the drum. The linings are preferably soaked in oil.

Figure 3:
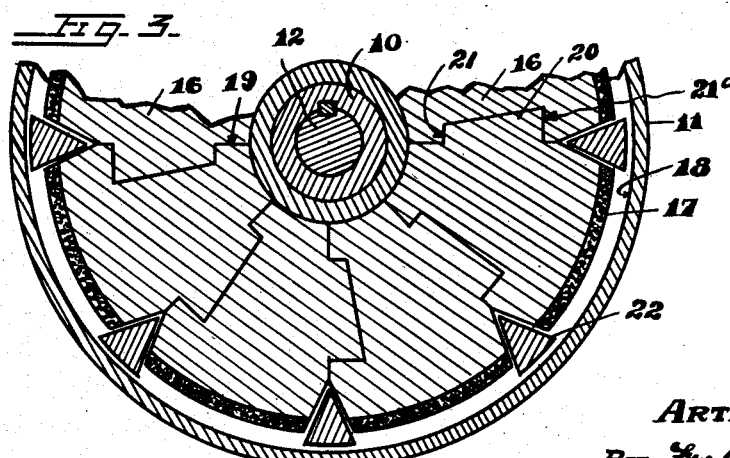
Figure 3 is a similar section, but showing the top portion broken away. In this view the shoes are illustrated as contracted or free.

The radial faces 19 of the segmental shoes interfit by means of the provision of projections 20 integral with one of these faces of each shoe; which projections are engaged with recesses supplied in the adjoining faces respectively of the adjacent shoes. This constitutes an interlocking structure that assumes the configuration of a ring when contracted as shown in Fig. 3. This ring, however, expands freely under centrifugal force and the component segments advance uniformly into engagement with the drum.

It is preferable, but not essential to make the projections and recesses with substantially rectangular sides 21 and 21ª perpendicular to radial lines.

Integral with or secured to the driving member is a number of circumposed driving dogs 22, there being one located at each juncture of the shoes near the periphery thereof. Each dog is wedge-shaped, the apex of the wedge in each case pointing towards the axis of rotation. The shoes are cut away to allow for the dogs.

The sides 21ª of the projections are disposed at a lesser distance from the dogs 22 than the thickness of the lining so that in the event of the lining wearing excessively these sides will encounter the dogs before the periphery of the shoes rub against the drum, thus preventing scoring the latter.

What I claim is:—

1. A centrifugal clutch comprising a driving member, a drum constituting a driven member, a complement of friction shoes carried by the driving member and having interfitting means to enable them to advance and recede in unison, and driving dogs borne by the driving member but not physically connected to the shoes.

2. A centrifugal clutch comprising a driving member, a drum constituting a driven member, a complement of friction shoes each of which is a segment of a ring that encircles the axis of rotation, the component segmental shoes functioning to preclude displacement of each other, said shoes being designed to interfit to enable them to advance and recede in unison, and dogs borne by the driving member but not physically connected to the shoes.

3. In a centrifugal clutch, a driving member, a driven member, a complement of metallic friction shoes for engagement with the driven member, linings affixed to the shoes, interfitting elements borne by the shoes to enable them to advance and recede in unison, and dogs carried by the driving member for precluding independent rotation of the shoes, said dogs also functioning to constrain the outward movement of the shoes to prevent them coming in contact with the driving member when the linings are worn excessively.

4. In a centrifugal clutch, a driving member, a driven member, a complement of metallic friction shoes for engagement with the driven member, linings affixed to the shoes, interfitting elements borne by the shoes to enable them to advance and recede in unison, and dogs carried by the driving member for precluding independent rotation of the shoes, said dogs being constructed and arranged to cooperate with the interfitting elements for the purpose of preventing the shoes from contacting with the driving member when the linings are excessively worn.

5. In a centrifugal clutch, a driving member, a driven member in drum form having an interior annular clutch surface, a complement of friction shoes loosely disposed for outward movement under centrifugal force, said shoes being segments of a ring, interfitting projections and recesses provided on the adjoining faces of the shoes to enable them to advance and recede in unison, linings affixed to the shoes, and dogs located at the adjoining faces of the shoes and arranged to engage the projections thereof at a slightly lesser distance than the thickness of the linings to prevent them from contacting with the clutch surface of the drum when the said linings are excessively worn.

Signed at Toronto, Canada, the 23rd day of December, 1927.

ARTHUR LOWNDES.